3,781,217
METHOD OF REPRESSING THE PRECIPITATION OF CALCIUM FLUOZIRCONATE
Billie J. Newby and Donald W. Rhodes, Idaho Falls, Idaho, assignors to the United States of America as represented by the United States Atomic Energy Commission
No Drawing. Filed July 3, 1972, Ser. No. 268,262
Int. Cl. C01g 43/00
U.S. Cl. 252—301.1 W                    9 Claims

ABSTRACT OF THE DISCLOSURE

Boric acid or a borate salt is added to aqueous solutions of fluoride containing radioactive wastes generated during the reprocessing of zirconium alloy nuclear fuels which are to be converted to solid form by calcining in a fluidized bed. The addition of calcium nitrate to the aqueous waste solutions to prevent fluoride volatility during calcination, causes the precipitation of calcium fluozirconate which precipitate further tends to form a gel at fluoride concentrations of 3.0 M or greater. The boron containing species which are introduced into the solution by the addition of the boric acid or borate salt retard the formation of the calcium fluozirconate precipitate and prevent formation of the gel. These boron containing species can be introduced into the solution by the addition of a borate salt but preferably are introduced by the addition of an aqueous solution of boric acid.

CONTRACTURAL ORIGIN OF THE INVENTION

This invention was made in the course of, or under, a contract with the United States Atomic Energy Commision.

BACKGROUND OF THE INVENTION

In the chemical reprocessing of spent nuclear reactor fuel elements to recover the unburned nuclear reactor fuel material, very large volumes of aqueous solutions containing radioactive wastes are generated. In addition to the large volumes produced, these aqueous wastes solutions are extremely corrosive and present difficult problems in their handling and storage. Since it is necessary to store these radioactive wastes for extremely long periods of time to permit decay of the highly radioactive fission products included in the wastes, the aqueous wastes are converted to a solid form which, in addition to occupying less volume than the corresponding liquid wastes, is less corrosive and poses less difficult problems in handling and long term storage. These aqueous radioactive wastes solutions are converted to solid form by calcining in a fluidized bed in the Waste Calcining Facility at the Idaho Chemical Processing Plant located at the United States Atomic Energy Commission's National Reactor Testing Station in Southeastern Idaho. The aqueous radioactive wastes solutions are transported through pipelines from makeup vessels to the Waste Calcining Facility where the aqueous solutions are converted to solid form by calcining in a fluidized bed, the aqueous solutions being injected into the fluidized bed through spray nozzles mounted on the walls.

When zirconium alloy nuclear fuels are reprocessed, an additional problem is encountered as it is necessary prior to calcining in the fluidized bed to add calcium nitrate to the resulting aqueous radioactive wastes solutions to prevent fluoride volatility during calcining. The addition of calcium nitrate to these solutions from the reprocessing of zirconium alloy nuclear fuels results in the precipitation of calcium fluozirconate. As the fluoride concentration of the wastes increases, more calcium nitrate must be added to prevent any fluoride volatility, correspondingly increasing the amount of calcium fluozirconate which precipitates. The calcium fluozirconate precipitate causes problems in transporting the wastes solutions through pipelines from the makeup vessels to the Waste Calcining Facilities fluidized bed and also tends to clog the wastes feed spray nozzles. Further problems develop with increasing fluoride concentrations as calcium fluozirconate percipitated from solutions with fluoride concentrations of 3.0 M or greater has a tendency to form a gel. Such a gel would likely prove impossible to transport through the pipelines to the fluidized bed and would cause problems with plugging of the wastes feed spray nozzles in the fluidized bed. Whereas fluoride containing waste solutions which have been calcined previously have had fluoride concentrations of about 2.8 M, similar wastes solutions to be calcined in the future are anticipated to have fluoride concentrations as high as 3.5 M or greater. Calcium fluozirconate precipitates from these wastes solutions are expected to pose special problems because of the formation of the gel and the excessive amounts of the precipitate which will be formed.

Therefore, it is desirable to find a method to prevent the formation of a calcium fluozirconate precipitate gel and it is further desirable to find a method of preventing or retarding the formation of excessive amounts of a calcium fluozirconate precipitate from fluoride containing waste solutions generated during the reprocessing of zirconium alloy nuclear fuels.

SUMMARY OF THE INVENTION

In accordance with the present invention, boric acid or a borate salt is added to an aqueous solution containing calcium, zirconium, and fluoride values in order to prevent the formation of a calcium fluozirconate gel and repress the precipitation of calcium fluozirconate. In particular, boric acid or a borate salt is added to such an aqueous solution of fluoride containing radioactive wastes generated during the reprocessing of zirconium alloy nuclear fuels which solution is to be converted to solid form by calcining in a fluidized bed and to which solution calcium nitrate is to be added to prevent fluoride volatility during calcining. The boron containing species which are present in aqueous solutions of boric acid and borate salts and which are introduced into the wastes solution by the addition of boric acid or a borate salt prevent the formation of a calcium fluozirconate gel and retards the formation of a precipitate, both of which would pose problems in the transporting of the aqueous wastes to the fluidized bed calciner and in the injecting of the wastes into the fluidized bed through the wastes feed nozzles.

Hereafter, those boron containing species which are present in aqueous solutions of boric acid or aqueous solutions of borate salts will be referred to as borate species or borates and where these terms hereinafter appear they should be so construed. While it is uncertain whether or not the effectiveness is repressing precipitation of calcium fluozirconate is dependent upon the particular form in which boron is present in the solution or whether other forms of boron may also be effective, boron present in the solution in the form of borates has been shown to be highly effective and is the form employed in the practice of the present invention. The borates can be introduced into the solution in several ways such as the addition of borate salts such as sodium borate as an example or by the addition of boric acid. The introduction of the borates by the addition of boric acid has been highly successful in the repressing of the formation of the precipitate. Therefore, in the practice of the present invention, it is preferred that the borates be introduced by the addition of boric acid both because of the fact that it is highly effective and because it is reasonably soluble in the aqueous wastes solution and is relatively inexpensive. The borates can be introduced into the aqueous wastes solution either by the addition of a solid compound and its subsequent dissolution in the wastes solution or by the preparation of a separate aqueous borate solution and the subsequent addition of this borate solution to the wastes solutions. In the preferred embodiment of the present invention, a separate aqueous solution of boric acid is prepared and this boric acid solution is added to the wastes solution.

The calcium fluozirconate which does precipitate in the presence of borates is granular in form and can be readily dispersed or slurried for transport through pipelines. While the nature of the mechanism by which the borates prevent the formation of the gel and repress the formation of a precipitate has not been determined, it has been found that even a minor amount produces a considerable effect. An increase in the amount of borates added to the wastes solution causes a corresponding increase in the repressive effect on the formation of the precipitate. Therefore, for those fluoride-containing wastes originally containing minor amounts of borate, sufficient additional amounts of borates can be added to prevent gel formation and retard precipitation. Likewise, if the amount of calcium fluozirconate precipitate becomes excessive for trouble-free operation, additional borates in excess of those already present can be added to the solution in an amount sufficient to further repress the formation of the precipitate to an acceptable level.

The repressive effect on the precipitation of calcium fluozirconate obtained by increasing the amount of borates added to the solution can be appreciated from a consideration of the following illustrative examples.

EXAMPLE I

An appropriate amount of calcium nitrate was added to 30 milliliters of a waste solution which was 3.2 M in fluoride and to which no borates had been added, this amount being an amount sufficient to give a ratio of calcium concentration to fluoride concentration of 0.55 M calcium to 1.0 M fluoride which ratio is also the standard ratio obtained prior to calcining by the addition of calcium nitrate in the subject process. The precipitate which resulted from the addition of the calcium nitrate was separated and compacted to yield 10 cubic centimeters of compacted calcium fluozirconate.

EXAMPLE II

A sufficient amount of a solution of boric acid to yield 2 grams per liter of boron was added to 30 milliliters of a similar waste solution which was 3.5 M in fluoride. Again the appropriate amount of calcium nitrate was added to the resulting solution. The granular precipitate which formed following the addition of the calcium nitrate was separated and compacted as in Example I to yield 6.3 cubic centimeters of compacted calcium fluozirconate.

EXAMPLE III

Boric acid was added to 30 milliliters of waste solution which was 3.5 M in fluoride and very similar to the waste solution of Example II in an amount sufficient to give 13 grams/liter of boron of which amount it is estimated, based on the solubility characteristics of the boric acid under the test conditions and the presumption that a saturated solution was formed, 6 grams/liter of boron were actually in solution. An appropriate amount of calcium nitrate was added to the resulting solution and the granular precipitate which formed following the addition was again separated and compacted as in the previous examples. The yield of calcium fluozirconate from this solution was 3.4 cubic centimeters of the compacted precipitate.

The embodiments of the invention in which an exclusive property or privilege is claimed are defined as follows:

1. A method of converting an aqueous solution of fluoride-containing radioactive wastes generated during the reprocessing of zirconium alloy nuclear fuels to a solid form, comprising: adding boric acid or a borate salt to said aqueous solution to prevent the formation of a calcium fluozirconate gel and repress the precipitation of calcium fluozirconate; adding calcium nitrate to said aqueous solution to prevent fluoride volatility; transporting the resulting solution to a fluidized bed calcining facility; and calcining said resulting solution to a solid in said fluidized bed calcining facility.

2. In the method of converting an aqueous solution to a solid in a fluidized bed calcining facility, where said aqueous solution contains calcium, zirconium, and fluoride values, an additional step to prevent the formation of a calcium fluozirconate gel and repress the precipitation of calcium fluozirconate comprising: adding boric acid to said solution and dissolving said boric acid in said solution.

3. The method of claim 2 wherein a borate salt is substituted for said boric acid.

4. The method of claim 2 wherein the boric acid is added as an aqueous solution of boric acid.

5. The method of claim 2 wherein said aqueous solution is a solution containing radioactive wastes from the reprocessing of zirconium alloy nuclear fuels.

6. The method of claim 5 wherein calcium nitrate is added to said solution to prevent fluoride volatility.

7. The method of claim 6 wherein additional boric acid or borate salt is added to a waste solution originally containing minor amounts of boron containing species.

8. The method of claim 2 wherein the fluoride concentration is 3.0 molar or greater.

9. In the method of converting an aqueous solution to a solid form by calcining the solution in a fluidized bed calcining facility, where said aqueous solution is a fluoride containing solution of radioactive wastes generated during the reprocessing of zirconium alloy nuclear fuels to which calcium nitrate is to be added to prevent fluoride volatility during calcining, the improvement wherein boric acid or a borate salt is added to said aqueous solution to prevent the formation of a calcium fluozirconate gel and repress the precipitation of calcium fluozirconate.

References Cited

UNITED STATES PATENTS

| | | | |
|---|---|---|---|
| 2,326,950 | 8/1943 | Kepfer | 210—57 |
| 3,008,904 | 11/1960 | Johnson et al. | 252—301.1 W |
| 3,479,295 | 11/1969 | Thompson | 252—301.1 W |
| 3,507,801 | 4/1970 | Kausz et al. | 252—301.1 W |

OTHER REFERENCES

Reactor Fuel Processing, vol. 4, No. 4, 1961, p. 61.
Reactor Fuel Processing, vol. 6. No. 2, 1963, p. 48.
Reactor Fuel Processing, vol. 9, No. 1, 1965, pp. 42–43.

BENJAMIN R. PADGETT, Primary Examiner

R. L. TATE, Assistant Examiner

U.S. Cl. X.R.

210—57; 252—301.1 R; 423—19